United States Patent
Alapuranen (10) Patent No.: US 7,116,632 B2
(45) Date of Patent: Oct. 3, 2006

(54) SYSTEM AND METHOD FOR DETERMINING SYNCHRONIZATION POINT IN OFDM MODEMS FOR ACCURATE TIME OF FLIGHT MEASUREMENT

(75) Inventor: Pertti O. Alapuranen, Melbourne, FL (US)

(73) Assignee: MeshNetworks, Inc., Maitlands, FL (US)

( * ) Notice: Subject to any disclaimer, the term of this patent is extended or adjusted under 35 U.S.C. 154(b) by 36 days.

(21) Appl. No.: 10/863,085

(22) Filed: Jun. 7, 2004

(65) Prior Publication Data

US 2004/0252630 A1    Dec. 16, 2004

Related U.S. Application Data

(60) Provisional application No. 60/475,883, filed on Jun. 5, 2003.

(51) Int. Cl.
*H04J 11/00* (2006.01)

(52) U.S. Cl. .................................... 370/208; 370/503

(58) Field of Classification Search ............. 370/208, 370/209, 210, 350, 503, 509, 510, 512, 514, 370/517, 519, 507, 513; 375/148, 149, 150, 375/152

See application file for complete search history.

(56) References Cited

U.S. PATENT DOCUMENTS

| | | | |
|---|---|---|---|
| 4,494,192 A | 1/1985 | Lew et al. | |
| 4,617,656 A | 10/1986 | Kobayashi et al. | |
| 4,736,371 A | 4/1988 | Tejima et al. | |
| 4,742,357 A | 5/1988 | Rackley | |
| 4,747,130 A | 5/1988 | Ho | |
| 4,910,521 A | 3/1990 | Mellon | |
| 5,034,961 A | 7/1991 | Adams | |
| 5,068,916 A | 11/1991 | Harrison et al. | |
| 5,231,634 A | 7/1993 | Giles et al. | |
| 5,233,604 A | 8/1993 | Ahmadi et al. | |
| 5,241,542 A | 8/1993 | Natarajan et al. | |
| 5,317,566 A | 5/1994 | Joshi | |
| 5,392,450 A | 2/1995 | Nossen | |
| 5,412,654 A | 5/1995 | Perkins | |
| 5,424,747 A | 6/1995 | Chazelas | |
| 5,502,722 A | 3/1996 | Fulghum | |
| 5,517,491 A | 5/1996 | Nanni et al. | |
| 5,555,425 A | 9/1996 | Zeller et al. | |
| 5,555,540 A | 9/1996 | Radke | |
| 5,572,528 A | 11/1996 | Shuen | |

(Continued)

FOREIGN PATENT DOCUMENTS

CA      2132180      3/1996

(Continued)

OTHER PUBLICATIONS

Wong, et al., "Soft Handoffs in CDMA Mobile Systems," Dec. 1997, IEEE Personal Communications.

(Continued)

*Primary Examiner*—Phirin Sam
(74) *Attorney, Agent, or Firm*—Randi L. Karpinia; Joseph J. Buczynsk (57) ABSTRACT

A system and method including an algorithm that can use the linear time shift property of the subcarrier modulation to provide accurate frame synchronization for communications between nodes in a wireless network, where nodes employ orthogonal frequency division multiplexing (OFDM) modems. The subcarrier modulation is typically performed with a Fast Fourier Transform (FFT) that includes a time shift between Inverse Fast Fourier Transform (IFFT) and guard interval insertion at transmission, but due to the guard insertion, the system and method of the present invention corrects the time shifts allowing accurate TOF calculations.

16 Claims, 3 Drawing Sheets

U.S. PATENT DOCUMENTS

| | | | |
|---|---|---|---|
| 5,596,582 A * | 1/1997 | Sato et al. .................. 370/509 |
| 5,615,212 A | 3/1997 | Ruszczyk et al. |
| 5,618,045 A | 4/1997 | Kagan et al. |
| 5,621,732 A | 4/1997 | Osawa |
| 5,623,495 A | 4/1997 | Eng et al. |
| 5,627,976 A | 5/1997 | McFarland et al. |
| 5,631,897 A | 5/1997 | Pacheco et al. |
| 5,644,576 A | 7/1997 | Bauchot et al. |
| 5,652,751 A | 7/1997 | Sharony |
| 5,680,392 A | 10/1997 | Semaan |
| 5,684,794 A | 11/1997 | Lopez et al. |
| 5,687,194 A | 11/1997 | Paneth et al. |
| 5,696,903 A | 12/1997 | Mahany |
| 5,701,294 A | 12/1997 | Ward et al. |
| 5,706,428 A | 1/1998 | Boer et al. |
| 5,717,689 A | 2/1998 | Ayanoglu |
| 5,745,483 A | 4/1998 | Nakagawa et al. |
| 5,774,876 A | 6/1998 | Wooley et al. |
| 5,781,540 A | 7/1998 | Malcolm et al. |
| 5,787,080 A | 7/1998 | Hulyalkar et al. |
| 5,794,154 A | 8/1998 | Bar-On et al. |
| 5,796,732 A | 8/1998 | Mazzola et al. |
| 5,796,741 A | 8/1998 | Saito et al. |
| 5,805,593 A | 9/1998 | Busche |
| 5,805,842 A | 9/1998 | Nagaraj et al. |
| 5,805,977 A | 9/1998 | Hill et al. |
| 5,809,518 A | 9/1998 | Lee |
| 5,822,309 A | 10/1998 | Ayanoglu et al. |
| 5,844,905 A | 12/1998 | McKay et al. |
| 5,845,097 A | 12/1998 | Kang et al. |
| 5,857,084 A | 1/1999 | Klein |
| 5,870,350 A | 2/1999 | Bertin et al. |
| 5,877,724 A | 3/1999 | Davis |
| 5,881,095 A | 3/1999 | Cadd |
| 5,881,372 A | 3/1999 | Kruys |
| 5,886,992 A | 3/1999 | Raatikainen et al. |
| 5,896,561 A | 4/1999 | Schrader et al. |
| 5,903,559 A | 5/1999 | Acharya et al. |
| 5,909,651 A | 6/1999 | Chander et al. |
| 5,936,953 A | 8/1999 | Simmons |
| 5,943,322 A | 8/1999 | Mayer et al. |
| 5,987,011 A | 11/1999 | Toh |
| 5,987,033 A | 11/1999 | Boer et al. |
| 5,991,279 A | 11/1999 | Haugli et al. |
| 6,028,853 A | 2/2000 | Haartsen |
| 6,029,217 A | 2/2000 | Arimilli et al. |
| 6,034,542 A | 3/2000 | Ridgeway |
| 6,044,062 A | 3/2000 | Brownrigg et al. |
| 6,047,330 A | 4/2000 | Stracke, Jr. |
| 6,052,594 A | 4/2000 | Chuang et al. |
| 6,052,752 A | 4/2000 | Kwon |
| 6,064,626 A | 5/2000 | Stevens |
| 6,067,291 A | 5/2000 | Kamerman et al. |
| 6,067,297 A | 5/2000 | Beach |
| 6,078,566 A | 6/2000 | Kikinis |
| 6,104,712 A | 8/2000 | Robert et al. |
| 6,108,738 A | 8/2000 | Chambers et al. |
| 6,115,580 A | 9/2000 | Chuprun et al. |
| 6,122,690 A | 9/2000 | Nannetti et al. |
| 6,130,881 A | 10/2000 | Stiller et al. |
| 6,132,306 A | 10/2000 | Trompower |
| 6,147,975 A | 11/2000 | Bowman-Amuah |
| 6,163,699 A | 12/2000 | Naor et al. |
| 6,178,337 B1 | 1/2001 | Spartz et al. |
| 6,192,053 B1 | 2/2001 | Angelico et al. |
| 6,192,230 B1 | 2/2001 | Van Bokhorst et al. |
| 6,208,870 B1 | 3/2001 | Lorello et al. |
| 6,222,463 B1 | 4/2001 | Rai |
| 6,222,504 B1 | 4/2001 | Oby |
| 6,223,240 B1 | 4/2001 | Odenwald et al. |
| 6,240,294 B1 | 5/2001 | Hamilton et al. |
| 6,246,875 B1 | 6/2001 | Seazholtz et al. |
| 6,249,516 B1 | 6/2001 | Brownrigg et al. |
| 6,275,707 B1 | 8/2001 | Reed et al. |
| 6,285,892 B1 | 9/2001 | Hulyalkar |
| 6,304,556 B1 | 10/2001 | Haas |
| 6,327,300 B1 | 12/2001 | Souissi et al. |
| 6,349,091 B1 | 2/2002 | Li |
| 6,349,210 B1 | 2/2002 | Li |
| 6,359,872 B1 | 3/2002 | Mahany et al. |
| 6,366,568 B1 | 4/2002 | Bolgiano et al. |
| 6,405,049 B1 | 6/2002 | Herrod et al. |
| 6,674,790 B1 * | 1/2004 | Rasmussen et al. ........ 375/146 |
| 6,771,976 B1 * | 8/2004 | Koyama ..................... 455/502 |
| 2001/0053699 A1 | 12/2001 | McCrady et al. |
| 2002/0013856 A1 | 1/2002 | Garcia-Luna-Aceves |
| 2004/0052319 A1 * | 3/2004 | Wakamatsu ................. 375/343 |
| 2004/0105512 A1 * | 6/2004 | Priotti ........................ 375/340 |
| 2004/0137929 A1 * | 7/2004 | Jones et al. ................. 455/517 |

FOREIGN PATENT DOCUMENTS

| | | |
|---|---|---|
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Wong et al., "A Pattern Recognition System for Handoff Algorithms," Jul. 2000, IEEE Journal on Selected Areas in Communications, vol. 18, No. 7.

Andras G. Valko, "Cellular IP: A New Approach to Internet Host Mobility," Jan. 1999, ACM Computer Communication Review.

Richard North, Dale Bryan and Dennis Baker, "Wireless Networked Radios: Comparison of Military, Commercial and R&D Protocols," Feb. 28-Mar. 3, 1999, 2nd Annual UCSD Conference on Wireless Communications, San Diego, CA.

Benjamin B. Peterson, Chris Kmiecik, Richard Hartnett, Patrick M. Thompson, Jose Mendoza and Hung Nguyen, "Spread Spectrum Indoor Geolocation," Aug. 1998, Navigation: Journal of the Institute of Navigation, vol. 45, No. 2, Summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols," Oct. 25-30, 1998, Proceedings of the 4th Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self-Organizing, Self-Healing Wireless Networks," 2000 IEEE.

J.J. Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing in Wireless Networks Using Link-State Information".

J.J. Garcia-Luna-Aceves and Ewerton L. Madruga, "The Core-Assisted Mesh Protocol," Aug. 1999, IEEE Journal on Selected Areas in Communications, vol. 17, No. 8.

Ad Kamerman and Guido Aben, "Net Throughput with IEEE 802.11 Wireless LANs".

J. R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks Using Transmit Power Adjustment".

Ram Ramanathan and Martha E. Steenstrup, "Hierarchically-Organized, Multihop Mobile Wireless Networks for Quality-of-Service Support".

Martha E. Steenstrup, "Dynamic Multipoint Virtual Circuits for Multimedia Traffic in Multihop Mobile Wireless Networks".

Zhenya Tang and J.J. Garcia-Luna-Aceves, "Collision-Avoidance Transmission Scheduling for Ad-Hoc Networks".

George Vardakas and Wendell Kishaba, "QoS Networking With Adaptive Link Control and Tactical Multi-Channel Software Radios".

* cited by examiner

SYSTEM AND METHOD FOR DETERMINING SYNCHRONIZATION POINT IN OFDM MODEMS FOR ACCURATE TIME OF FLIGHT MEASUREMENT

This application claims benefit from U.S. Provisional Patent Application Ser. No. 60/475,883, filed on Jun. 5, 2003, the entire content of which is incorporated herein by reference.

BACKGROUND OF THE INVENTION

1. Field of the Invention

The present invention relates to a system and method for providing accurate data for use in performing Time of Flight (TOF) measurements in communications between nodes in a wireless network, where nodes employ orthogonal frequency division multiplexing (OFDM) modems. Specifically, the system and method provides an algorithm for use with the linear time shift property of the data demodulation in OFDM implementations to correct the time shift and allow accurate calculation of synchronization points for TOF calculations.

2. Description of the Related Art

Wireless communication networks, such as mobile wireless telephone networks, have become increasingly prevalent over the past decade. These wireless communications networks are commonly referred to as "cellular networks", because the network infrastructure is arranged to divide the service area into a plurality of regions called "cells". A terrestrial cellular network includes a plurality of interconnected base stations, or base nodes, that are distributed geographically at designated locations throughout the service area. Each base node includes one or more transceivers that are capable of transmitting and receiving electromagnetic signals, such as radio frequency (RF) communications signals, to and from mobile user nodes, such as wireless telephones, located within the coverage area. The communication signals include, for example, voice data that has been modulated according to a desired modulation technique and transmitted as data packets.

In recent years, a type of mobile communications network known as an "ad-hoc" network has been developed for use by the military. In this type of network, each mobile node is capable of operating as a base station or router for the other mobile nodes, thus eliminating the need for a fixed infrastructure of base stations. Details of an ad-hoc network are set forth in U.S. Pat. No. 5,943,322 to Mayor, the entire content of which is incorporated herein by reference.

More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, and in U.S. patent application Ser. No. 09/815,164 entitled "Prioritized-Routing for an Ad-Hoc, Peer-to-Peer, Mobile Radio Access System", filed on Mar. 22, 2001, the entire content of each being incorporated herein by reference.

As can be appreciated by one skilled in the art, network nodes transmit and receive data packet communications in a multiplexed format, such as time-division multiple access (TDMA) format, code-division multiple access (CDMA) format, or frequency-division multiple access (FDMA) format, which enables a single transceiver at the base node to communicate simultaneously with several mobile nodes in its coverage area. Yet another multicarrier transmission technique includes orthogonal frequency division multiplexing (OFDM). This technique divides the available spectrum into many carriers, each one being modulated by a low rate data stream. OFDM is similar to FDMA in that the multiple user access is achieved by subdividing the available bandwidth into multiple channels that are then allocated to users. However, OFDM uses the spectrum much more efficiently by spacing the channels much closer together. This is achieved by making all the carriers orthogonal to one another, preventing interference between the closely spaced carriers.

In such multicarrier transmissions, there unfortunately exists a degree of multiuser interference. As discussed in an article by Victor Shtrom entitled "CDMA vs OFDM In Broadband Wireless Access", the entire content of which is being incorporated herein by reference, the use of synchronous CDMA can lower multiuser interference. Synchronization lowers interference by time-aligning the chip boundaries of all users, however, multipath destroys synchronicity due to reflections from buildings and other topographic obstacles. Signals travel different distances while in route to the receiver and thus arrive out of sync. As noted by Shtrom, it is also difficult to synchronize users because the differing time-of-flight (TOF) delays depend on user location.

Additionally, in OFDM implementations, the time frame synchronization requirements for data demodulation also may not be suitable for TOF measurements. For example, Time of Flight measurements in certain applications require accurate measurement of the round-trip delay from source to destination, and back to the source. The destination must receive the signal and transmit a signal back to the source with a high degree of timing accuracy. In other applications not requiring round trip delay measurements, timing accuracy for signal transmission and receipt is still crucial. However, in an OFDM modem transmission, the subcarrier modulation is performed with a Fast Fourier Transform (FFT) that typically includes a time shift between Inverse Fast Fourier Transform (IFFT) and guard interval insertion at transmission, affecting TOF measurements. This time shift could thus adversely affect timing accuracy.

Accordingly, a need exists for a system and method to provide accurate frame synchronization for communications between nodes in a wireless network, where nodes employ orthogonal frequency division multiplexing (OFDM) modems.

SUMMARY OF THE INVENTION

An object of the present invention is to provide a system and method to provide accurate frame synchronization for communications between nodes in a wireless network, where nodes employ orthogonal frequency division multiplexing (OFDM) modems.

Another object of the present invention is to provide a system and method for providing an algorithm that accurately calculates a time of detection of a frame relative to the internal timer or counter of a wireless device receiving the frame.

Another object of the present invention is to provide a system and method for providing an algorithm that computes a linear frequency shift from at least one FFT transformed pilot signal in a communication.

Another object of the present invention is to provide a system and method for providing an algorithm that modifies a calculated roundtrip counter value, that is measured in time domain and is the synchronization point for the frame that is converted to frequency domain, with a delay that is computed from a linear phase shift of subcarriers in frequency domain.

A further object of the present invention is to provide a system and method for providing an algorithm that is capable of capturing the count value of an internal clock cycle counter of a wireless device when the wireless device receives a TOF frame, and using the count value and interpolating a linear phase shift from pilot signals to correct the TOF measurement.

Another object of the present invention is to provide a system and method for using a Discrete Fourier Transform (DFT) of the time shifted frame using the linear frequency shift calculated from transformed pilot signals in a communication.

These and other objects are substantially achieved by a system and method for providing an algorithm that can use the linear time shift property of the subcarrier modulation to provide accurate frame synchronization for communications between nodes in a wireless network, where nodes employ orthogonal frequency division multiplexing (OFDM) modems. The subcarrier modulation is typically performed with a Fast Fourier Transform (FFT) that includes a time shift between Inverse Fast Fourier Transform (IFFT) and guard interval insertion at transmission, but due to the guard insertion, such time shifts can be corrected.

The algorithm takes note that the start of the sampling for the FFT window is also the starting point for the roundtrip counter. This counter serves to count the clock cycles required from the reception of the frame to the transmission of the response frame. The algorithm computes the linear frequency shift from FFT transformed pilot signals, or tones, which inserted to frames for channel impulse response measurements. The algorithm modifies the roundtrip counter value with the delay that is computed from the linear phase shift. The modified roundtrip counter can then initiate transmission of the response frame, or the roundtrip counter is inserted to the transmitted frame so that an accurate TOF can be computed.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

As noted above, time of flight (TOF) calculations require accurate measurements of round-trip delays from a source radio, or node, to a destination node, and thereafter back to the source node. The destination node therefore, has to receive the sent signal and transmit a return signal back to the source node with a high degree of timing accuracy. In OFDM implementations however, the time frame synchronization requirements for data demodulation may not be suitable for TOF measurements.

The signal processing in the OFDM modem is done both in time and frequency domain, and the synchronization point that is coarse is usually acquired in time domain. This time domain synchronization point may be time shifted as in most cases, it is not an accurate starting point of the frame. The modems work by detecting start of frame by some method, for example, delay, and correlate and normalize resulting signal and detect starting point with some function, for example by thresholding so that the first value that exceeds threshold is the starting point of the frame. Time shifting may not be accurately measured easily in OFDM modem in time domain, but in frequency domain this time shift can be measured as a linear frequency shift. Actual linear frequency shift is measured as phase shift of subcarriers. So time shift of the frame in time domain is equivalent to linear frequency shift in frequency domain.

Therefore, the embodiment of the present invention described below includes a software and/or hardware implemented algorithm at one or more nodes that can use the linear time shift property of the subcarrier modulation (FFT) to provide accurate frame synchronization for communications between nodes in a wireless network, where the nodes employ orthogonal frequency division multiplexing (OFDM) modems. Such communications can typically occur in any number of node network configurations, such as network 100 of FIG. 1, for various purposes, such as geographic position determination.

Figure 1:
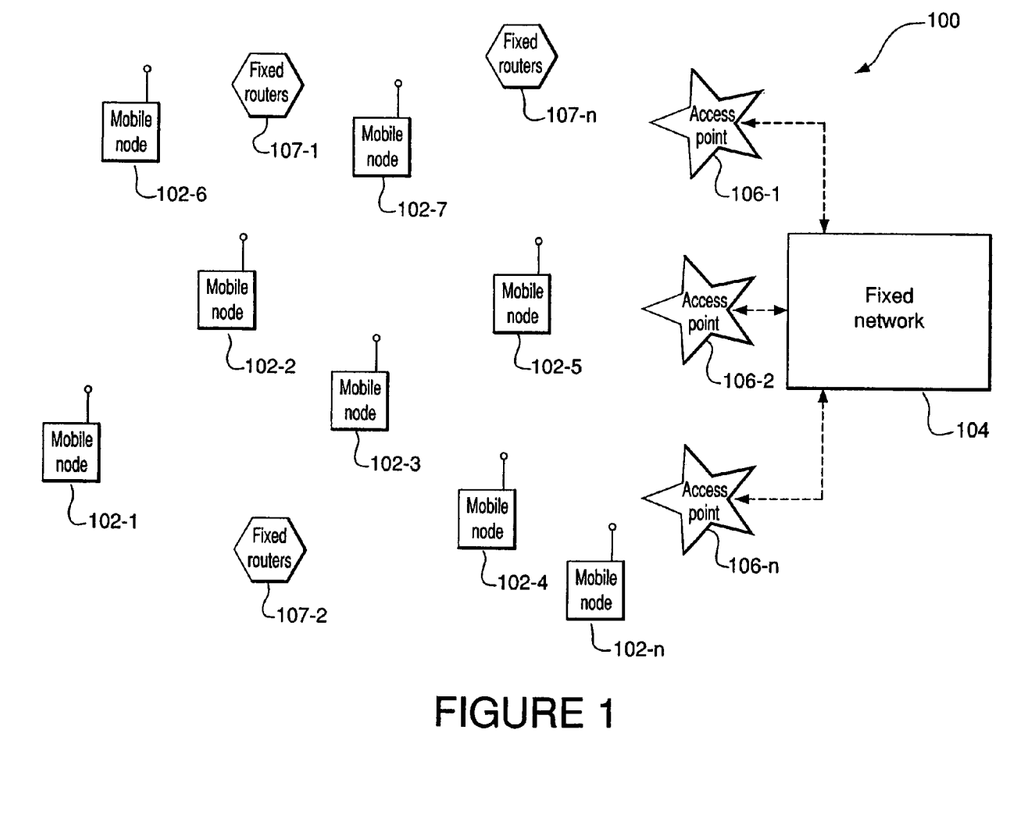
FIG. 1 is a block diagram of an example ad-hoc packet switched wireless communications network including a plurality of nodes in accordance with an embodiment of the present invention.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes 102 or mobile nodes 102), and can, but is not required to, include a fixed network 104 having a plurality of access points 106-1, 106-2, . . . 106-n (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107 or fixed routers 107) for routing data packets between other nodes 102, 106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. No. 5,943,322 to Mayor, and in U.S. patent application Ser. Nos. 09/897,790, 09/815,157 and 09/815,164, referenced above.

Figure 2:
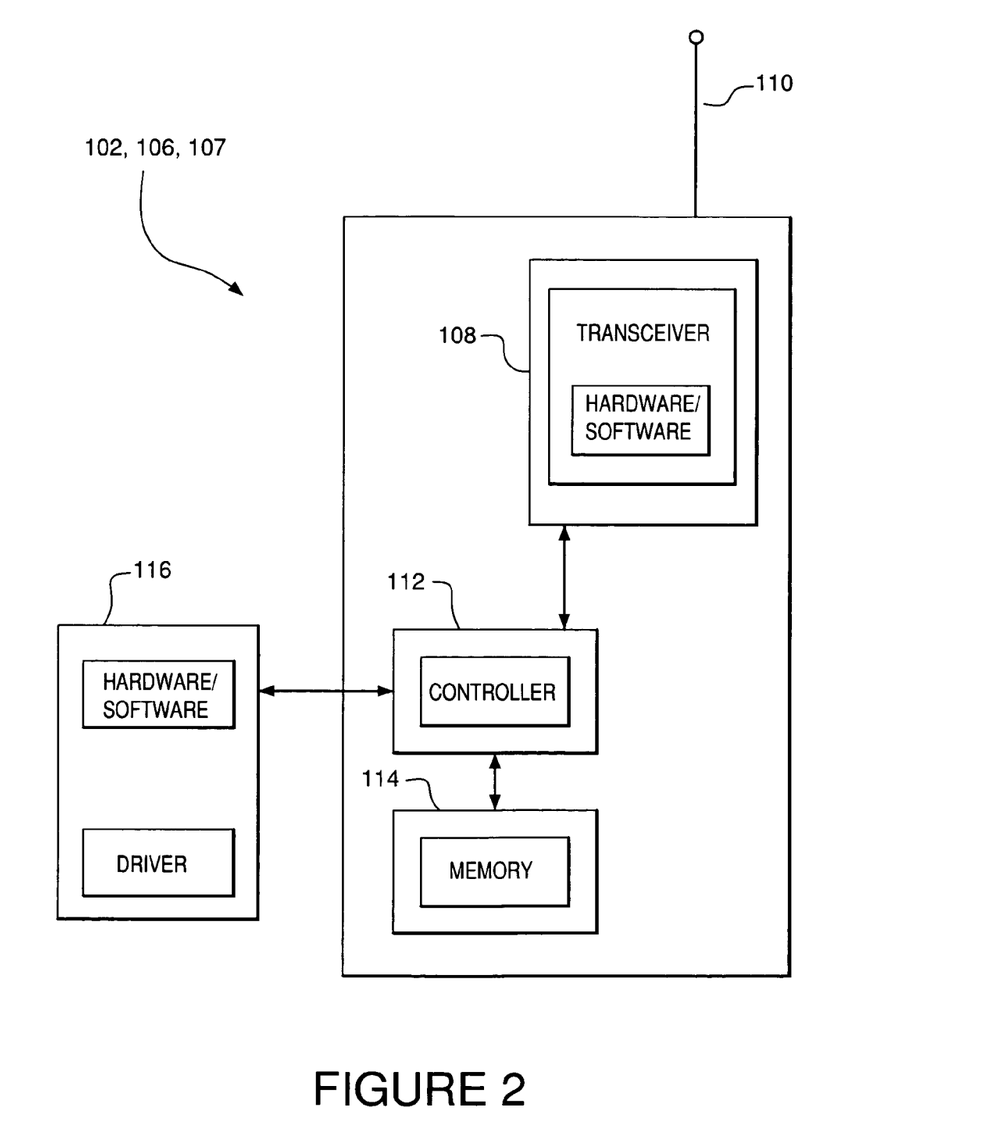
FIG. 2 is a block diagram illustrating an example of a mobile node employed in the network shown in FIG. 1.

As shown in FIG. 2, each node 102, 106 and 107 includes a transceiver, or modem 108, which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM), that is capable of storing, among other things, routing information pertaining to itself and other nodes in the network 100. The nodes 102, 106 and 107 periodically exchange their respective routing information, referred to as routing advertisements or routing table information, with each other via a broadcasting mechanism, for example, when a new node enters the network 100, or when existing nodes in the network 100 move.

As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included. Additionally, each node includes the appropriate hardware and software to perform Time Of Flight (TOF) calculations, as set forth in greater detail below.

The modem 108 of each node also includes the capability to identify, differentiate and measure the arrival time of signals received at a node 102, 106 and 107, both via direct paths and reflected paths, from other nodes of the network. Algorithms in use at each node can use a "Time Of Arrival" (TOA) measurement technique, and may provide the distance between nodes for computing individual node positions where the measurements are based upon signal propagation times, or signal "Time Of Flight" (TOF).

The embodiment of the present invention described below discloses an algorithm for use with a modem, such as an OFDM modem 108 to provide a TOF measurement with greater accuracy. The algorithm described below may be located at each node 102, 106 and 107 of FIG. 1, and may be located either at the modem of the node 108 or at the node host 116. As stated above, each node has the capability to distinguish and identify signals received from another node via direct and reflected paths, and using such signals and path information, determine and collect node distance values.

As noted above, in OFDM implementations the frame synchronization requirements for data demodulation may not be suitable for TOF measurements. In OFDM modulation, frame synchronization does not need to be very accurate as is the case with some other modulations, for example spread spectrum. Measuring accurate synchronization point can be expensive as this hardware may not be needed for demodulation. Also, the OFDM waveform is not designed for this purpose.

Figure 3:
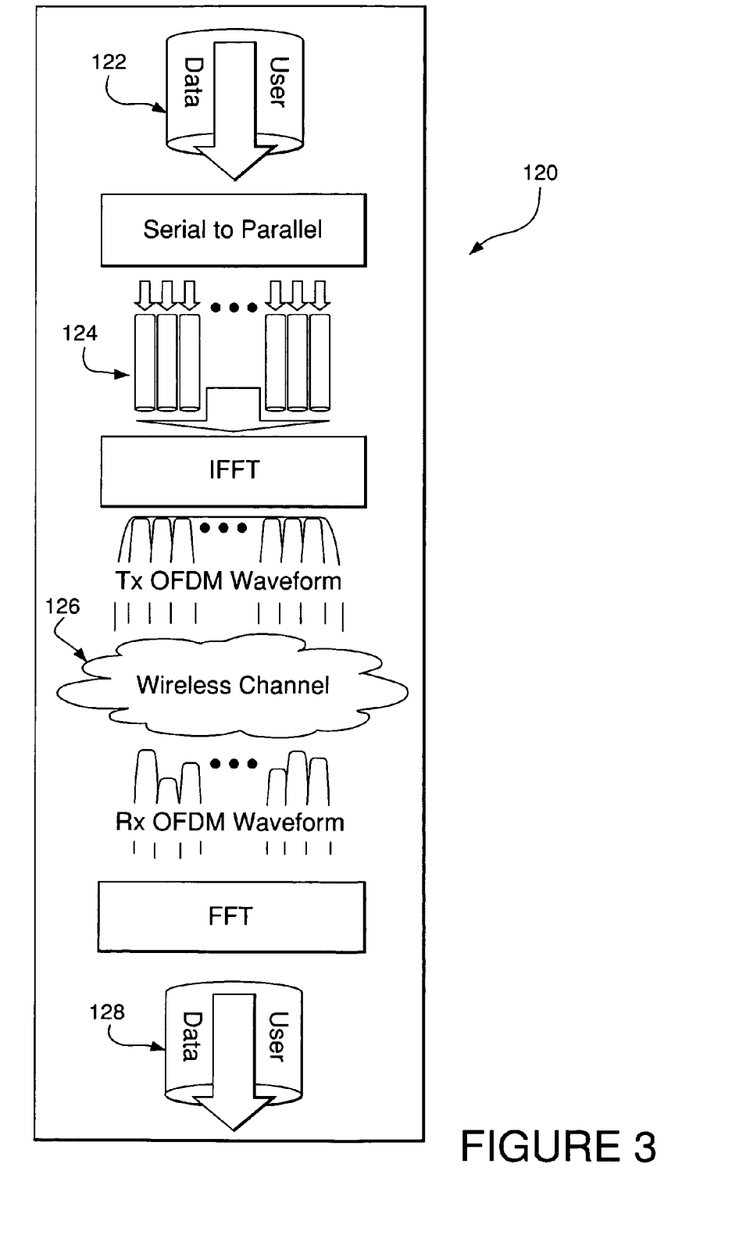
FIG. 3 is a block diagram illustrating an example of an OFDM communication model in accordance with an embodiment of the present invention.

As discussed in the Shtrom article referenced above, an OFDM modem takes a broadband data pipe and distributes it among many parallel bins as shown in FIG. 3. FIG. 3 is a block diagram illustrating an example of an OFDM communication model in accordance with an embodiment of the present invention.

As shown in FIG. 3, an OFDM communication model 120 illustrates an OFDM modem, which takes a broadband data pipe 122 and distributes it among many parallel channels, or subcarriers 124, the exact number being a function of the Fast Fourier Transform (FFT) size. The parallel channels are then modulated by the inverse FFT (IFFT). The resulting signal frames, containing a bank of narrow-band carriers, is then upconverted to an RF frequency, amplified and transmitted via a wireless channel 126. The receiver then demodulates the received signal via the FFT into user data 128.

The subcarrier modulation is typically performed with a Fast Fourier Transform that includes a time shift between Inverse Fast Fourier Transform (IFFT) and guard interval insertion at transmission, but due to the guard insertion, the embodiment of the present invention can correct such time shifts. The FFT expects the signal to be circular, while linear time shift is not circular in nature. Guard effectively converts convolution to circular convolution. Convolution in time domain is multiplication in frequency domain, but if FFT is used, multiplication in frequency domain is actually circular convolution in time domain. Guard makes sure that signal in time domain is "circular".

In the OFDM communication model 120 of FIG. 3, the transmitted frames may be time shifted, but due to guard period this shift can be corrected as it produces linear frequency dependent phase shift for the complex signal after the FFT transform. In an OFDM modem, the channel impulse response is usually in frequency domain instead of time domain as is typically found in spread spectrum modems. In an embodiment of the present invention, an algorithm can be executed to use this linear time shift property to compute an accurate synchronization point for TOF measurements.

As noted above, the signal processing in the OFDM modem is done both in time and frequency domain, and the synchronization point that is coarse is acquired in time domain. This time domain synchronization point may be time shifted as in most cases, it is not an accurate starting point of the frame. The modems work by detecting start of frame by some method, for example, delay, and correlate and normalize resulting signal and detect starting point with some function, for example by thresholding so that the first value that exceeds threshold is the starting point of the frame. Time shifting may not be accurately measured easily in OFDM modem in time domain, but in frequency domain this time shift can be measured as a linear frequency shift. Actual linear frequency shift is measured as phase shift of subcarriers. So time shift of the frame in time domain is equivalent to linear frequency shift in frequency domain. Another reason for estimating time shift from frequency domain linear frequency shift is that it provides a subsample accuracy. This can be done in time domain, but it may require additional hardware.

As will now be described, the synchronization according to an embodiment of the present invention includes two phases, namely, a frame detection phase and a fine timing synchronization phase. During the frame detection phase, the process detects that a frame is present. During the synchronization phase, timing synchronization is performed by cross-correlating a stored waveform and the received frame, which can give high accuracy up to one sample. The cross-correlation can be done in the frequency domain, which may be more complicated than the time domain due to the length of the FFTs used in the frequency domain. Accordingly, if the radio channel impulse response length is P and the frame length is N, then to avoid aliasing the FFT length should be set in accordance with the following equation:

$$FFT\ length \geq N+P+1$$

As can be appreciated by one skilled in the art of signal processing theory, this rule sets a limit to avoid aliasing. That is, in time domain, sampling rate has to be equivalent or higher than 2× of the highest frequency to avoid frequency domain aliasing in accordance with, for example, the Nyquist sampling theorem or Shannon sampling theorem. In frequency domain processing, the similar rule applies to avoid time domain aliasing. An example is that if FFT length is 64 and a frame is correlated that has length 64, then FFT shall be 64+64+1=129, which is not very practical. Usually, FFT length shall be 2 powL, that is, if FFT length of 128 is chosen (which is 2x the length of 802.11a FFT) then L=6, N=64 and P=63 and there is no time alias. In this case, P is the length of the complex frame taken from samples of the data stream received. One drawback, however, is that the frame has to be run through inverse FFT to get it back to time domain for finding the peak. Nevertheless, the reason why this is still efficient is that the number of complex multiplications is much less than that which occurs with cross correlation if one of the correlated sequence is not binary, that is, coefficients are not (±1±j), in which case multiplies can be converted to additions and subtractions.

Hence, in the frame detection step, the algorithm takes note that the start of the sampling for the FFT modulator window is also the starting point for the roundtrip counter. The counter is calculated and serves to count the clock cycles required from the reception of the frame to the transmission of the response frame.

In the timing synchronization step, the algorithm computes the linear frequency shift of each frame from FFT transformed pilot signals. These pilot signals, or tones, are inserted to frames for channel impulse response measurements. Typically, each frame contains one or more such pilot tones for channel estimation and time/frequency synchronization.

In a roundtrip TOF calculation, during the timing synchronization step, the algorithm modifies the calculated roundtrip counter value with a delay that is computed from the linear frequency shift (phase shift of pilots). The modified roundtrip counter then initiates transmission of the response frame, or the roundtrip counter value is inserted to the transmitted frame so that TOF can be computed.

The Discrete Fourier Transform (DFT) of the time shifted frame is shown below in equation (1), which is used to calculate the linear frequency shift described above.

$$DFT_k[\text{shift}_\Delta(x)] = e^{-j\omega k \Delta} X(k) \quad (1)$$

where k represents frame number, x represents the subcarrier, ω represents carrier frequency, and Δ represents the linear frequency shift from an FFT transformed pilot signals. The linear time shift, or delay used in step 3 is interpolated from the pilot signals.

The transformed frame consists of subcarriers and pilots and data subcarriers are interleaved. For example every Nth subcarrier is a pilot. The carrier phase is interpolated for each subcarrier based on pilots around it, for example, Example: P0 D0 D1 D2 D3 P1 D4 D5 D6 D7 P2 D8 D9 D10 D11 P3 . . .

Pilots P0,P1,P2,P3, . . . can be measured.

For each data subcarrier phase is estimated by interpolating. For example for D5, P1 and P2 can be interpolated. This can be done in various ways but the result is that this interpolated signal has linear phase term that can be extracted.

In the above embodiment, the algorithm allows an accurate measurement TOF with OFDM modems with minor changes. The frequency domain impulse response is used to compute time shift of start of sampling for FFT.

It is also noted that the above TOF measurements and synchronization calculations can be performed for multiple frames, and then the shortest or mean value can be used as the desired TOF value.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined.

What is claimed is:

1. A method for determining a synchronization point in an orthogonal frequency division multiplexing (OFDM) modem of a node in a wireless communication network, the synchronization point being used for time of flight (TOF) measurements, the method comprising:
   detecting receipt of a frame by the node;
   cross-correlating the receipt of the received frame with a stored waveform in the node to determine the synchronization point; and
   performing TOF measurements using the determined synchronization point by operating a counter in the node to count a period of time from receipt of the frame by the node, based on the determined synchronization point, to transmission of a response frame by the node.

2. A method as claimed in claim 1, wherein:
   the cross-correlating is performed to determine the synchronization point relative to a counter in the node.

3. A method as claimed in claim 1, wherein:
   the node is a wireless node and the network is an ad-hoc multi-hopping peer-to-peer communication network.

4. A method as claimed in claim 3, wherein:
   the node is a mobile node.

5. A method as claimed in claim 1, wherein:
   the TOF measurements performing step comprises operating a counter to count relative to the synchronization point of the received frame.

6. A method as claimed in claim 1, wherein:
   the TOF measurements performing step comprises operating a counter to count relative to transmission by the node of a frame to another node.

7. A method as claimed in claim 1, further comprises:
   modifying the counted period of time in accordance with a delay calculated in accordance with a linear frequency shift of pilot tones in a plurality of frames received by the node.

8. A method as claimed in claim 1, wherein:
   the detecting step comprises detecting each of a plurality of frames by the node; and
   the cross-correlating step comprises cross-correlating each respective time of receipt of each respective received frame with a respective stored waveform in the node to determine the respective synchronization point for each respective frame.

9. A system for determining a synchronization point in an orthogonal frequency division multiplexing (OFDM) modem of a node in a wireless communication network, the synchronization point being used for time of flight (TOF) measurements, the system comprising:

a controller, adapted to detect receipt of a frame by the node, and further adapted to cross-correlate the receipt of the received frame with a stored waveform in the node to determine the synchronization point, and to control the node to perform TOF measurements using the determined synchronization point by operating a counter in the node to count a period of time from receipt of the frame by the node, based on the determined synchronization point, to transmission of a response frame by the node.

10. A system as claimed in claim 9, wherein:

the controller is adapted to perform the cross-correlating to determine the synchronization point relative to a counter in the node.

11. A system as claimed in claim 9, wherein:

the controller is present in the node which is a wireless node, and the network is an ad-hoc multi-hopping peer-to-peer communication network.

12. A system as claimed in claim 11, wherein:

the node is a mobile node.

13. A system as claimed in claim 9, wherein:

the controller is adapted to perform the TOF measurements by operating a counter to count relative to the synchronization point of the received frame.

14. A system as claimed in claim 9, wherein:

the controller is adapted to perform the TOF measurements by operating a counter to count relative to transmission by the node of a frame to another node.

15. A system as claimed in claim 9, wherein:

the controller is further adapted to modify the counted period of time in accordance with a delay calculated in accordance with a linear frequency shift of pilot tones in a plurality of frames received by the node.

16. A system as claimed in claim 9, wherein the controller is further adapted to:

detect each of a plurality of frames by the node; and cross-correlate each respective time of receipt of each respective received frame with a respective stored waveform in the node to determine the respective synchronization point for each respective frame.

* * * * *